United States Patent [19]

Blom

[11] 4,200,888
[45] Apr. 29, 1980

[54] TELEVISION CAMERA CIRCUIT COMPRISING A GAMMA AND AN APERTURE CORRECTION CIRCUIT

[75] Inventor: Hendrik Blom, Breda, Netherlands

[73] Assignee: U.S. Philips Corporation, New York, N.Y.

[21] Appl. No.: 958,315

[22] Filed: Nov. 6, 1978

[30] Foreign Application Priority Data

Nov. 28, 1977 [NL] Netherlands .................... 7713050

[51] Int. Cl.$^2$ .......................... H04N 5/14; H04N 5/20
[52] U.S. Cl. ..................................... 358/162; 358/164
[58] Field of Search .................. 358/21, 32, 160, 162, 358/164

[56] References Cited

U.S. PATENT DOCUMENTS

| | | | |
|---|---|---|---|
| 3,919,470 | 11/1975 | Blom et al. | 358/162 |
| 4,057,828 | 11/1977 | Monahan | 358/164 X |

FOREIGN PATENT DOCUMENTS

1614513  7/1978  Netherlands .................. 358/164

*Primary Examiner*—John C. Martin
*Assistant Examiner*—Aristotelis M. Psitos
*Attorney, Agent, or Firm*—Thomas A. Briody; William J. Streeter; Edward W. Goodman

[57] ABSTRACT

A combined gamma and aperture (or contour) correction circuit for the picture signal in a television camera, the aperture correction signal having signal values, which are negative and positive-going relative to a reference value, being split into a negative and a positive aperture correction signal. The positive correction signal is added to the picture signal before gamma correction and the negative correction signal is added to the picture signal after the gamma correction. The result is an improved aperture and contour correction, respectively, and less noise in the contours in the darker picture portions.

2 Claims, 4 Drawing Figures

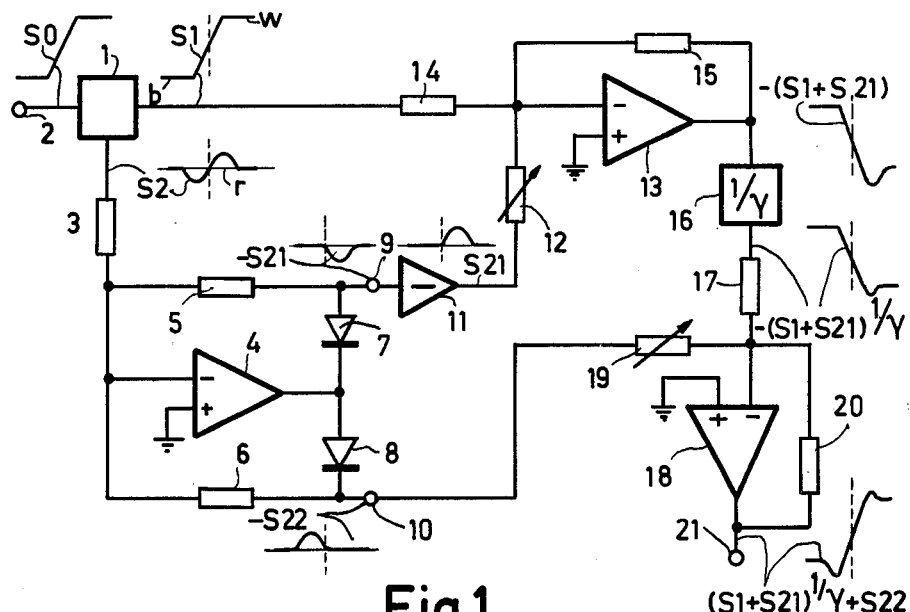
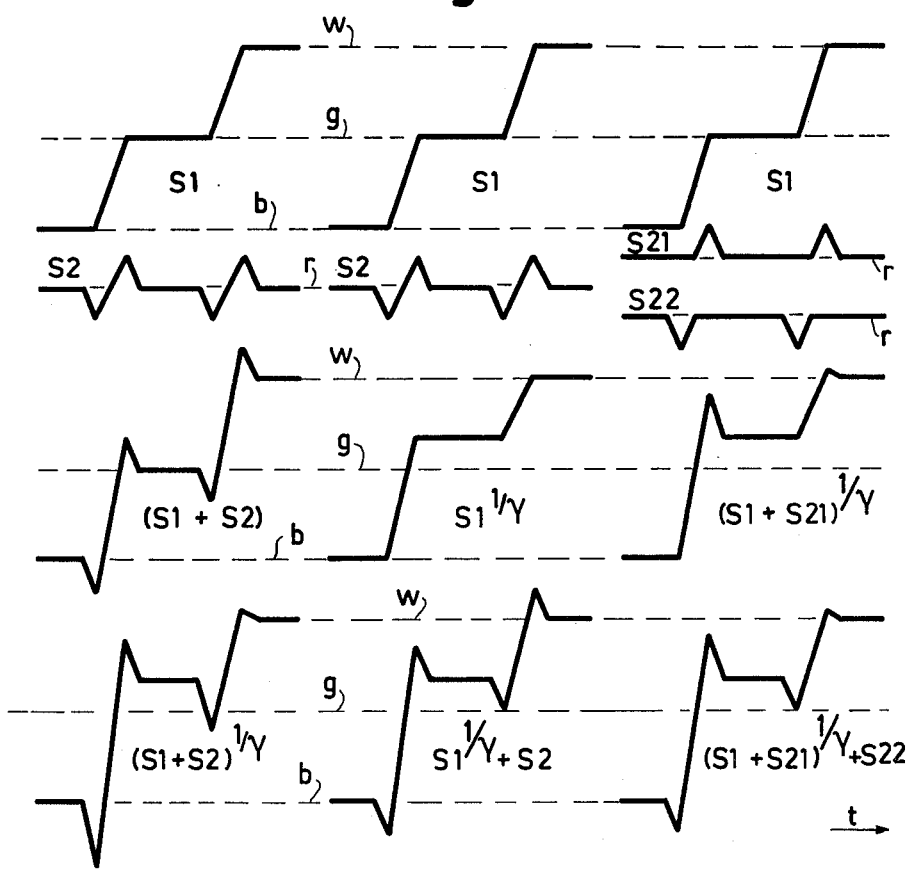
Fig.1
Fig.2a    Fig.2b    Fig.2c

TELEVISION CAMERA CIRCUIT COMPRISING A GAMMA AND AN APERTURE CORRECTION CIRCUIT

BACKGROUND OF THE INVENTION

The invention relates to a television camera circuit comprising a gamma and an aperture correction circuit for a television picture signal, the aperture correction circuit being provided with a correction signal generator for deriving, from the picture signal varying between a black level and a peak white value, an aperture correction signal having a negative and a positive-going signal value relative to a reference value.

Such a television camera circuit is proposed in U.S. Pat. No. 3,919,470. It is described that the combination of horizontal and/or vertical aperture correction, for emphasizing signal transition on a display, and gamma connection, for adaptation of the linear optoelectronic recording characteristic at the camera to the non-linear electro-optical display characteristic at the picture display apparatus, may result, with certain luminance values, in a deterioration instead of rather than an improvement in a picture quality. Namely, the gamma correction results in lower luminance values, at the black level in particular, in an exaggerated, excessively wide and, consequently, annoying emphasizing of signal transitions.

The above-mentioned patent discloses as a solution, the formation of an asymmetrical aperture correction signal to be added to the picture signal, the asymmetry in the correction signal being such that the subsequent gamma correction, effected on the aperture-corrected picture signal, does not furnish the exaggerated emphasis on the picture display. For completeness it should be noted that the degree of asymmetry has further been made dependent on the instantaneous value of the picture signal.

SUMMARY OF THE INVENTION

The present application describes a different solution of the described problem which can be used advantageously for an improvement in the picture quality on a picture display. To this end the television camera circuit, according to the invention, is characterized in that the aperture correction circuit comprises a first and a second terminal at which an aperture correction signal occurs, associated with said positive and negative going correction signal values, respectively, the first terminal being connected to a first input of a first superposition stage, to a second input of which the picture signal is applied and whose output is connected to the input of the camera correction circuit, the second terminal being connected to a first input of a second superposition stage, a second input of which is connected to the output of the gamma correction circuit and whose output carries an aperture and gamma-corrected picture signal.

The invention is based on the recognition that a satisfactory picture quality improvement on display can be achieved by adding before and after the gamma correction, the positive and the negative-going aperture correction signal values, respectively, to the picture signal. On display, the improvement in the sharpness is accompanied by a noise reduction in the contours of darker picture portions.

An embodiment of a circuit according to the invention is characterized in that the aperture correction signal, at the first and second terminal, is added in a controllable and adjustable manner, respectively, in the first and second superposition stage, respectively, to the picture signal whose gamma is to be corrected or has been corrected, respectively. It is, for example, possible to make the controllability dependent on the instantaneous picture signal value and the adjustability may mean a simple adjustment of an adjustable gain factor.

DESCRIPTION OF THE DRAWING

The invention will be further explained by way of non-limitative example with reference to the following figures in which:

FIG. 1 shows a circuit diagram for a television camera circuit according to the invention, and FIG. 2a, 2b and 2c are signal diagrams as a function of the time, FIG. 2a and 2b illustrating the signal processings to be rejected and FIG. 2c the signal processing according to the invention.

DESCRIPTION OF THE PREFERRED EMBODIMENT

In the circuit diagram shown in FIG. 1, reference numeral 1 denotes a customary aperture correction signal generator which supplies, when being applied to an input terminal 2 of a television picture signal S0, a delayed picture signal S1 and an aperture correction signal S2. U.S. Pat. No. 3,919,470 describes the signal generator 1 which is known per se so that here the remark that the generator 1 generates a horizontal and-/or a vertical aperture correction signal is sufficient, the signal S2 shown in FIG. 2 representing the horizontal aperture correction signal. The use of horizontal and vertical aperture correction is indicated by means of contour correction as, on display, picture contours are emphasized. In the signal S2, negative and positive-going signal values are shown relative to a reference value r, for example the ground potential. At the signal S1 of FIG. 1, reference b denotes a black level and w a peak value level of a black-white transition, the aperture correction signal S2 shown in the drawing being generated by the generator 1.

FIG. 2a, 2b and 2c show diagrammatically a picture signal S1 having two signal transitions which occur one after the other in time t. The first transition occurs from the black level b onwards to a grey value g and the second, an equally large transition, occurs from the grey value g to the peak-white value w. The aperture correction signal S2 shown in the FIGS. 2a and 2b consequently shows the variation depicted in the drawing.

FIG. 2a illustrates a prior art possibility for the use of both aperture and gamma correction. In FIG. 2a it is indicated that first, a signal (S1+S2) as well as an aperture-corrected picture signal, is formed and that then the gamma correction is applied which furnishes the gamma and aperture-corrected picture signal $(S1+S2)^{1/\gamma}$, shown in the drawing.

FIG. 2b illustrates a further possibility. Herein the aperture correction is performed outside the gamma correction because the picture signal S1 is first gamma-corrected, furnishing the signal $S1^{1/\gamma}$ and, thereafter, the aperture correction signal S2 is added, which furnishes the gamma and aperture-corrected picture signal $S1^{1/\gamma}+S2$.

A further consideration of the diagrammatically shown, gamma and aperture (contour)-corrected picture signals of FIGS. 2a and 2b, has the following result.

For FIG. 2a it follows that in the dark picture portions, the negative-going contour parts are elongated, whereas in the brighter picture portions, the positive-going contour parts are compressed. The result is: little improvement in the sharpness in the brigher picture portions and coarse black contours in the darker picture portions. For FIG. 2b it follows that, in the brighter picture portions, there are very bright positive and negative-going contour parts whereas relatively weak contours occur in the darker picture portions. The picture gets a "warty" appearance.

To avoid the correction errors produced during the signal processing according to FIGS. 2a and 2b, the signal processing indicated in FIG. 2c is used in the circuit of FIG. 1. The aperture correction signal S2 is then split into a signal S21 having the positive-going signal values and a signal S22 having the negative-going signal values. Thereafter a signal (S1+S21) is formed which, after gamma correction, furnishes a signal $(S1+S21)^{1/\gamma}$ and the correction signal S22 is added to this signal, resulting in a gamma and aperture (contour)-corrected signal $(S1+S21)^{1/\gamma}+S22$. The result is that in the bright picture portions the positive and negative-going contour parts occur which are balanced in the correct manner by means of the gamma correction, whereas in the darker picture portions good positive-going and somewhat reduced negative-going contour parts occur.

Besides the described improvement of the contour quality, the addition of the negative-going contour parts, after the gamma correction, furnishes a noise advantage as the noise present in the negative-going contour parts is not additionally intensified by the gamma correction.

For performing the signal processing described for FIG. 2c, the output of the aperture and contour correction signal generator 1 is connected via a resistor 3 to the inverting (−) input of a differential amplifier 4 whose non-inverting (+) input is connected to ground. The inverting input of the amplifier 4 is furthermore connected to the output thereof via two series arrangements, each having a resistor 5 and 6 and a diode 7 and 8, respectively, the diodes 7 and 8 having opposite pass directions. The junction of the resistor 5 and the anode of diode 7 is connected to a first terminal 9 while the junction of the resistor 6 and the cathode of the diode 8 is connected to a second terminal 10.

Terminal 9 carries a signal −S21, shown next to it in the drawing, relating to the positive-going signal values in the signal S2. This positive signal value furnishes a negative voltage at the output of the amplifier 4 which is found at the terminal 9 via the conducting diode 7. Likewise, the negative signal values in the signal S2 furnish positive voltages at the amplifier output which results in the signal −S22, shown in the drawing next to the terminal 10, via the then conducting diode 8.

The signal −S21 is applied, via an inverting amplifier 11 in series with a controllable or adjustable resistor 12, to the (−) input of a differential amplifier 13. The (−) input of the amplifier 13 is furthermore connected via a resistor 14 to the output of the correction signal generator 1, this output carrying a delayed picture signal S1, and, via a resistor 15, to the output of the amplifier 13. Consequently, the output of amplifier 13 carries the inverted sum signal of the signals S1 and S21 applied thereto, each multiplied by a given factor depending on the values of the resistors 12, 14 and 15. Starting from a multiplication factor equal to unity, the signal −(S1+S21) is shown in FIG. 1 at the output of the amplifier 13. Together with the resistors 12, 14 and 15, the amplifier 13 operates as a superposition stage (12–15).

The output of the amplifier 13 is connected to the input of a gamma correction circuit 16. The implementation of the circuit 16 is not discussed since any known implementation is applicable. The gamma correction circuit 16 is, for example, of the type in which the gamma correction is performed dependent on the video frequency. FIG. 1 shows that the output of the gamma correction circuit 16 carries a gamma-corrected signal $-(S1+S21)^{1/\gamma}$. The output of circuit 16 is connected via a resistor 17 to the (−) input of a differential amplifier 18 whose (+) input is connected to ground. The (−) input of the amplifier 18 is furthermore connected via a controllable or adjustable resistor 19 to the second terminal 10 and via a resistor 20 to the output of the amplifier 18. The amplifier output is connected to output 21 of the camera circuit of FIG. 1 at which, consequently, a gamma and aperture (contour)-corrected picture signal $(S1+S21)^{1/\gamma}+S22$ occurs. Together with the resistors 17, 19 and 20 the amplifier 18 constitutes a superposition stage (17–20) to which the same considerations apply as given for the stage (12–15).

It appears that the signal processing described in FIG. 2c can be performed by means of the circuit of FIG. 1. Instead of the detailed embodiment shown in FIG. 1 thoughts might go towards other embodiments. The controllable and adjustable resistors 12 and 19, respectively, can have any desired construction. For a control of the correction signals S21 and S22, desired in dependency on the instantaneous value of the picture signal S1, it is possible to construct the controllable resistor 12 or 19 as a transistor having an insulated gate electrode to which the picture signal S1 is applied, the source-discharge path furnishing the variable resistance.

A gamma correction circuit 16 having a gamma correction depending on the video frequency, in which a reduced or no gamma correction is used for high frequency picture signals in dark picture portions can here be used in an advantageous manner. The bandwidth restriction of the picture signals associated with the picture portions, which is normally accompanied by a widening and a distortion, respectively, of the negative contour parts has no influence in the circuit of FIG. 1 as these negative contour parts are inserted after gamma correction.

What is claimed is:

1. A television camera circuit comprising a gamma and aperture correction circuit for a television picture signal, the aperture correction circuit being provided with a correction signal generator for deriving, from the picture signal varying between a black level and a peak-white value, an aperture correction signal having a negative and a positive-going signal value relative to a reference value, wherein the aperture correction circuit comprises a first and second terminal, at which an aperture correction signal occurs, associated with said positive and negative-going correction signal value, respectively, a first superposition stage having a first and a second input and an output, the first terminal being connected to the first input of the first superposition stage, the picture signal being applied to the second input thereof and the output of the first superposition stage being connected to the input of the gamma correction circuit, and a second superposition stage having a first and a second input and an output, the second terminal being connected to the first input of the second superposition stage, the second input of which being connected to the output of the gamma correction circuit, and the output of the second superposition stage carrying an aperture and gamma-corrected picture signal.

2. A television camera circuit as claimed in claim 1, wherein the aperture correction signal, at the first terminal, is added, in a controllable manner in the first superposition stage, to the picture signal whose gamma is to be corrected and, at the second terminal, is added, in an adjustable manner in the second superposition stage, to the picture signal whose gamma has been corrected.

* * * * *